(12) United States Patent
Figaro et al.

(10) Patent No.: US 7,930,148 B1
(45) Date of Patent: Apr. 19, 2011

(54) SPHERICAL CALIBRATION AND REFERENCE ALIGNMENT ALGORITHMS

(75) Inventors: Davy Figaro, Sebastopol, CA (US);
Tyler Bryant, Santa Rosa, CA (US);
Anders Boeen, San Rafael, CA (US)

(73) Assignee: PNI Sensor Corporation, Santa Rosa, CA (US)

( * ) Notice: Subject to any disclaimer, the term of this patent is extended or adjusted under 35 U.S.C. 154(b) by 308 days.

(21) Appl. No.: 12/251,338

(22) Filed: Oct. 14, 2008

Related U.S. Application Data

(60) Provisional application No. 61/099,425, filed on Sep. 23, 2008, provisional application No. 60/956,907, filed on Aug. 20, 2007.

(51) Int. Cl.
*G06F 15/00* (2006.01)
*E21B 47/02* (2006.01)
(52) U.S. Cl. .......................... 702/196; 33/312
(58) Field of Classification Search .................. 702/154, 702/196; 33/312, 313
See application file for complete search history.

(56) References Cited

U.S. PATENT DOCUMENTS 3,791,043 A * 2/1974 Russell ............................ 33/312
4,768,152 A * 8/1988 Egli et al. ........................ 702/6

* cited by examiner

*Primary Examiner* — Bryan Bui
(74) *Attorney, Agent, or Firm* — Fernandez & Associates, LLP

(57) ABSTRACT

Inclinometer and directional field sensor readings can have gain, offset, and non-orthogonality errors, as well as reference alignment rotation errors. When a series of readings are taken by a three axis sensor with a variety of different orientations, the resulting dataset looks like a perfect hypothetical sphere in the absence of any errors; with errors as mentioned above the dataset looks like an offset, rotated, ellipsoidal quadratic surface. This invention provides a simple method of removing the above errors from a tilt reference device. A disclosed algorithm is divided into two distinct components: the ellipsoidal quadratic surface component, which covers gain, offset, and axis misalignment; and the rotation component, which covers rotation relative to a set of reference axes. The solution presented here addresses both components combined, or separated and for inclinometers, magnetometers and rate sensors.

22 Claims, 17 Drawing Sheets

Illustration of distorted accelerometer ellipsoid

Figure 1:
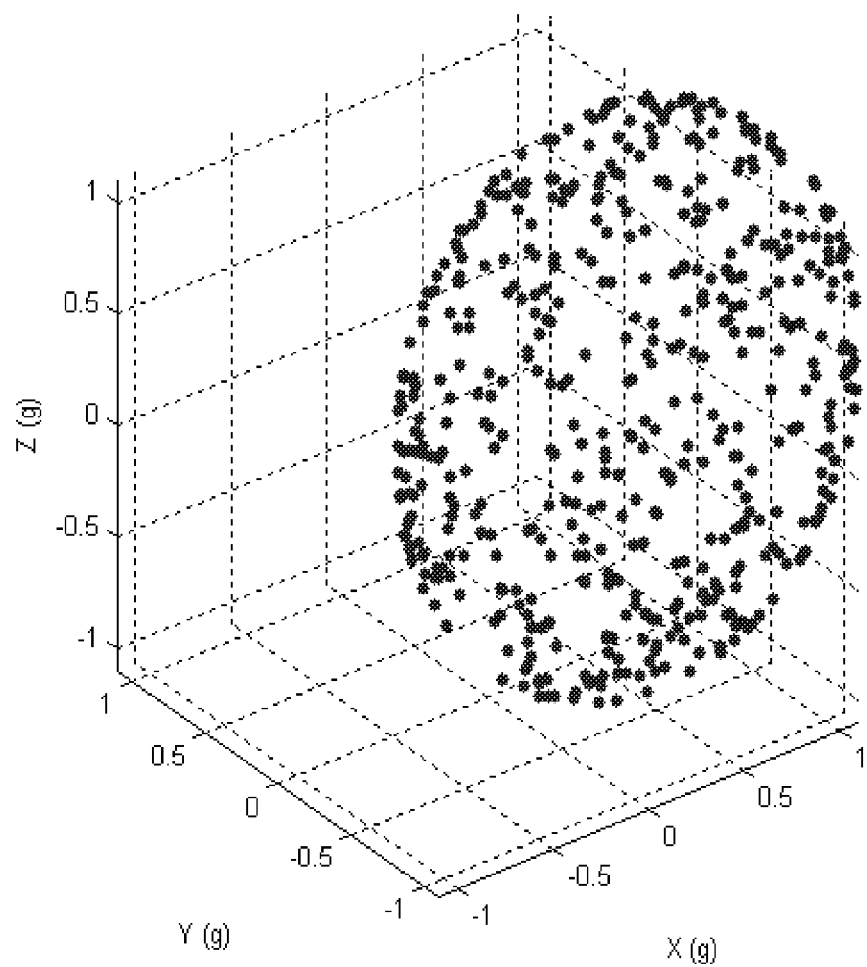

Figure 2a Simulation showing accelerometer distortion corrections (230 points):
True acceleration sphere of 230 points (circles, 210)
Distorted Accelerometer Readings (dots, 220)
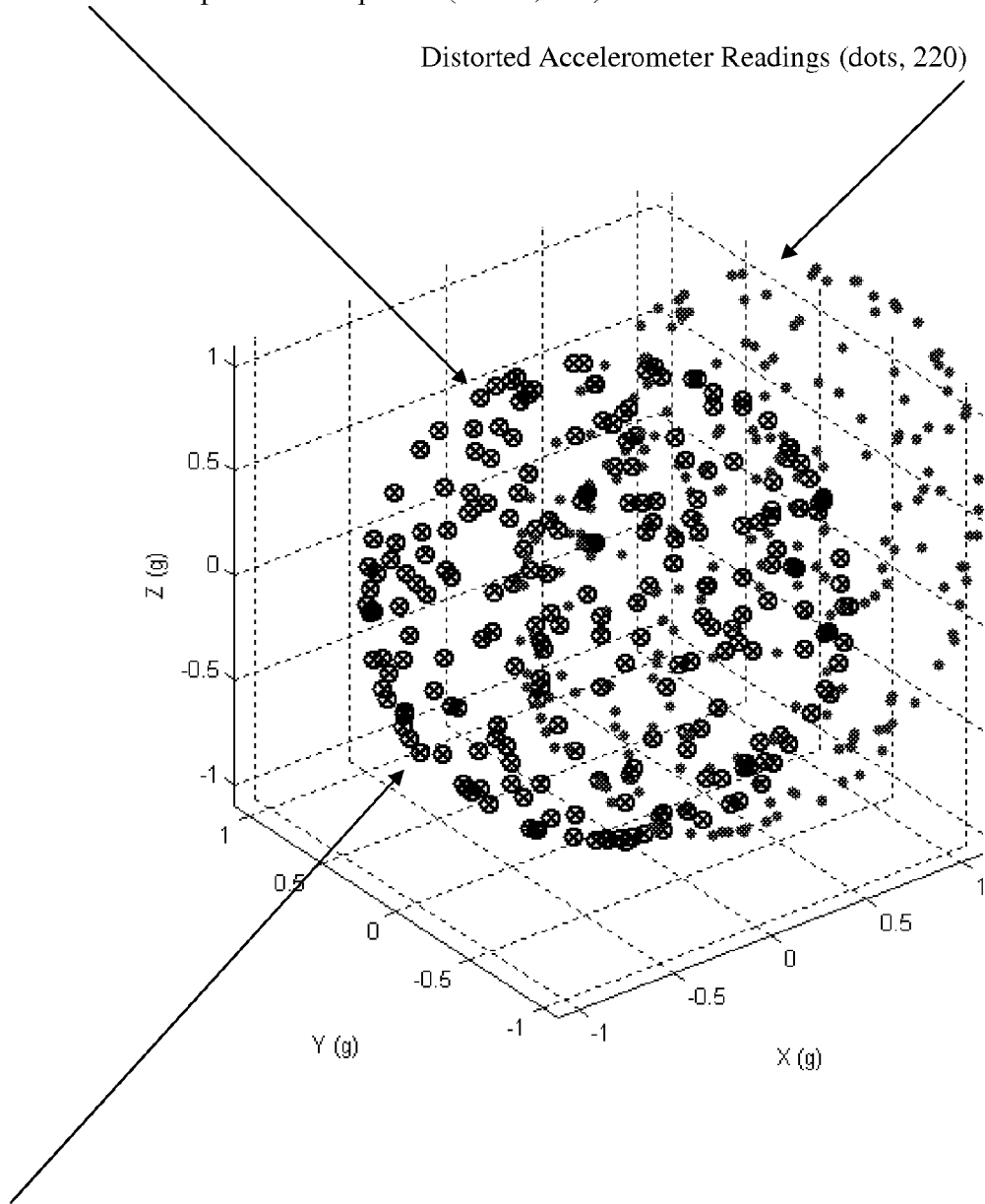
Corrected Accelerometer Readings (X's, 230) corrected with calculated TR & OF matrices.
["X's" are inside circles after correction]

Variation in g reading for all simulation points before and after correction.

"Zero" variation after correction indicates a perfectly centered sphere.

Real measured accelerometer distortion corrections (18 point cal):

Distorted Accelerometer Readings (circles)

Corrected Accelerometer Readings (X's) corrected with calculated TR & OF matrices.

Variation in g reading for all points before and after correction for the 18 point real accelerometer cal.

"Zero" variation after correction indicates a perfectly centered sphere.

Reference Alignment Calibration Principle of Operation

- Solid lines are device frame measurement axes, 401[X], 402[Y], 403[Z].

- Dotted lines are physical reference frame axes 411[x], 412[y], 413[z], (10°, 0, 10°).

- Reference measurement, 420, is rotated 180° around VphysZ to become new measurement (430).

Reference Alignment Calibration

- 520 is initial reference measurement

- 530 Mdev1 is rotated phi1= pi from reference around Vphys1

540 measurement: Mdev2 is rotated phi2=pi from reference around Vphys2

550 measurement: Mdev3 is rotated phi3=pi/2 from reference around Vphys3

Reference Alignment Calibration Converges after 14 passes
• Thin solid lines are device frame measurement axes
• Dotted lines with solid circles are physical reference frame axes (5, 10, 15deg)

• Dotted lines with outline triangle, star, and diamond show intermediate Mdevest vectors Alternative Reference Alignment Calibration
- Measurement rotation '1' as seen in earth frame (ef)
- External reference rotation plane is defined by the plane's normal Urot1_ef, which is fixed in the earth frame.

Alternative Reference Alignment Calibration
- Measurement rotation '2' as seen in earth frame (ef)
- External reference rotation plane is defined by the plane's normal Urot2_ef, which is fixed in the earth frame.

Figure 7c
Alternative Reference Alignment Calibration
- Measurement rotations '1' & '2' as seen in device frame (df)

- Device frame is the frame the measurements are taken in, which may be misaligned from the physical frame. The cal process will align the device frame to the physical frame.

- Physical frame is comprised of RphysX, RphysY, and RphysZ, and is fixed in the device frame, but may be misaligned from the device frame.

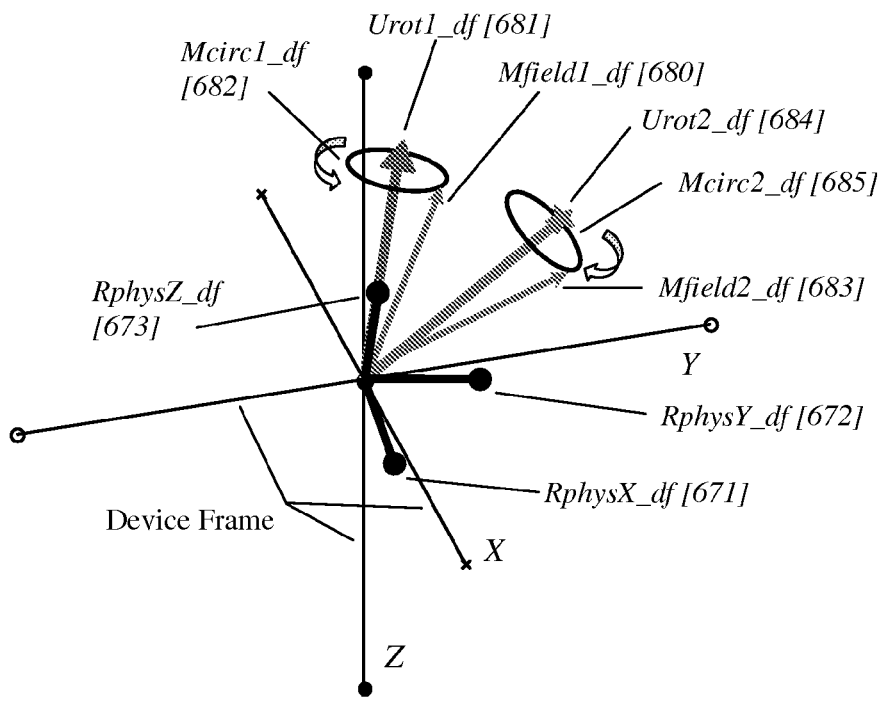

Spherical Calibration Data Flow

Reference Alignment Calibration Data Flow

Factory Alignment Calibration
- Thick solid lines are device frame measurement axes in reference alignment

- X's represent reference orientation measurement

- Physical reference frame is rotated from device frame axes (1, 20, 10 deg)

Factory Alignment Calibration - Example 1

- Mdev1 rotation from measured (solid points) back to estimated reference position (outline points); Mdev2 is not shown here for clarity

- First rotation estimate, showing initial Vphys1 axis estimate – left

Phi1=pi

- Subsequent & final rotation estimates, showing final Vphys1 estimate matching Vphys1 - right Factory Alignment Calibration - rotation error.
* Residual rotation error on each pass of the rotation fit estimate

SPHERICAL CALIBRATION AND REFERENCE ALIGNMENT ALGORITHMS

PRIORITY

Applicant claims priority from U.S. Provisional application Ser. No. 60/956,907 filed on Aug. 20, 2007.

CROSS-REFERENCE TO RELATED APPLICATIONS

The present invention is related in part to U.S. Pat. No. 4,851,775, U.S. Pat. No. 5,239,264, U.S. Pat. No. 5,381,603, U.S. Pat. No. 5,428,902, U.S. Pat. No. 5,680,708, U.S. Pat. No. 6,084,406, U.S. Pat. No. 6,243,660, U.S. Pat. No. 6,297,732, U.S. Pat. No. 6,374,079, U.S. Pat. No. 6,549,145, U.S. Pat. No. 6,729,176, U.S. application Ser. Nos. 11/502,593, 11/856,973, 12/017,161, 12/194,427 and Provisional Application 60/956,907 and 61/099,425 filed Sep. 23, 2008. Disclosure from these patents and applications is included herein in their entirety by reference.

BACKGROUND OF THE INVENTION

1. Field of the Invention

The invention relates generally to a method and apparatus to correct compass magnetic heading and/or orientation sensing indications to account for gain, offset, and orthogonality errors, as well as reference alignment rotation errors.

2. Description of Related Art Including Information Disclosed Under 37 CFR 1.97 and 1.98.

Directional field measurement sensors such as inclinometers and magnetometers can have gain, offset, and orthogonality errors, as well as reference alignment rotation errors. If a series of 3 axis sensor readings are taken with a variety of different orientations, the resulting dataset looks like a perfect sphere in the absence of any errors; with all the above errors it looks like an offset, rotated, ellipsoidal surface. Correcting this ellipsoidal surface back to a correctly aligned sphere centered at the origin removes, or at least minimizes, gain, offset, and orthogonality errors, as well as reference alignment rotation errors. As used herein an inclinometer is of a group comprising clinometer, tilt meter, tilt indicator, gradiometer, pitch and roll indicator, accelerometer, liquid capacitive, electrolytic and MEMS based devices of the preceding; for purposes of the instant invention a gyroscope, of one, two or three axes, is included in this group; these terms may be used interchangeably and all cases are meant to be inclusive of the group. The term "sensor", as used herein, comprises inclinometers, including gyroscopes, and magnetometers and others as may be known by one knowledgeable in the art. In some embodiments a sensor is a rate sensor; a rate sensor may be a gyroscope sensing rate of angular change; a rate sensor may be an angular rate sensor of one, two or three axes of a group comprising but not limited to coriolis vibratory gyro, MEMS angular rate sensor, fiber optic gyroscope, gyrocompass, ring laser gyroscope; a rate sensor may be a magnetometer comprising timing circuits and other components sufficient to measure angular rate of change through a relatively static magnetic environment; a rate sensor may be an accelerometer comprising timing circuits and other components sufficient to measure angular rate of change through a relatively static inertial environment; a rate sensor may be a sensor as may be known by one knowledgeable in the art comprising timing circuits and other components sufficient to measure angular rate of change through a relatively static environment;

One common method of removing all these errors involves employing a calibration test system that orients the sensor at a multitude of known orientations. The resulting set of points can be used to determine the gain, offset, and cross axis terms to reduce the errors. This method may work, but suffers from potential limitations. One limitation is that determining an exact orientation at each measured point can be difficult because of mechanical limitations. Another limitation is that there may be a need to perform a calibration when such equipment is too expensive or not available. For instance, a field calibration to correct for drift or alignment changes would be quite useful, even if the sensors were originally calibrated in a factory test system.

Prior art is found in: Automatic sensor alignment, U.S. Pat. No. 5,245,909, Spacecraft accelerometer auto-alignment, U.S. Pat. No. 4,749,157; Calibration of 3D field sensors; U.S. Pat. No. 7,275,008. All patents, patent applications, and other documents referenced herein are incorporated by reference in their entirety for all purposes, unless otherwise indicated.

BRIEF SUMMARY OF THE INVENTION

An inclinometer, or tilt, sensor may have gain, offset, and orthogonality errors, as well as reference alignment rotation errors. These errors can be divided into two distinct components: gain, offset, and axis misalignment error can be plotted in the shape of an offset ellipsoid, showing gain, offset, and axis misalignment, as in FIG. 1; and a rotation portion, comprising rotation errors relative to a set of reference axes. When a series of readings are taken by a three axis sensor with a variety of different orientations, the resulting dataset looks like a perfect hypothetical sphere in the absence of any errors; with the errors mentioned above it looks like an offset, rotated, ellipsoidal quadratic surface. This invention discloses a simple method of removing all of the above errors from a tilt reference device. The solution presented here addresses both components combined, or separated. The two components are first discussed as separate entities, and then a technique for combining them is disclosed.

The first component, an ellipsoidal shape error portion, also termed "Spherical Calibration", gathers a set of tilt sensor data while a device is rotating through various orientations, traversing as much of a sphere as possible in terms of rotating through different possible tilt angles. The exact orientations of the data set need not be known at each measured point. Then the tilt sensor dataset is fitted to an ellipsoid to determine transform and offset matrices. This technique is used on a tilt sensor or inclinometer to remove and/or minimize gain and offset errors. This technique can also be used on a magnetometer to remove and/or minimize gain, soft iron distortion, as well as hard iron distortion.

The second component, comprising rotation errors, also termed "Reference Alignment Calibration", corrects for reference axes alignment errors. The method, in one implementation, involves rotating through a known angle phi, θ, on two or more axes from a reference measurement, and then calculating a rotation matrix to bring the reference axes into alignment with the physical rotation. Another implementation performs a series of rotations around a series of rotation axes. In this case the angle rotation between the rotation axes is known, rather than the rotation angle phi from a reference reading.

A tilt sensor calibration usually drifts over time. It is therefore advantageous to have a field calibration capability to periodically compensate for drifts and/or changes. Both Spherical Calibration and Reference Alignment Calibration address this issue.

Additionally, even a perfectly calibrated tilt sensor may need to be rotationally aligned with a particular set of physical rotation axes once the unit is placed into a parent system. Mechanical methods for this alignment are often difficult, time consuming, and imperfect. Reference Alignment Calibration addresses this issue.

Note that a reference alignment calibration algorithm may be used to align magnetic fields as well. Combining the disclosed calibration techniques for inclinometer and magnetometer calibration enhances the accuracy of both.

BRIEF DESCRIPTION OF THE SEVERAL VIEWS OF THE DRAWING(S)

FIG. 1 Illustration of distorted inclinometer ellipsoid

FIG. 2*a* Simulation showing inclinometer distortion corrections.

Figure 2B:
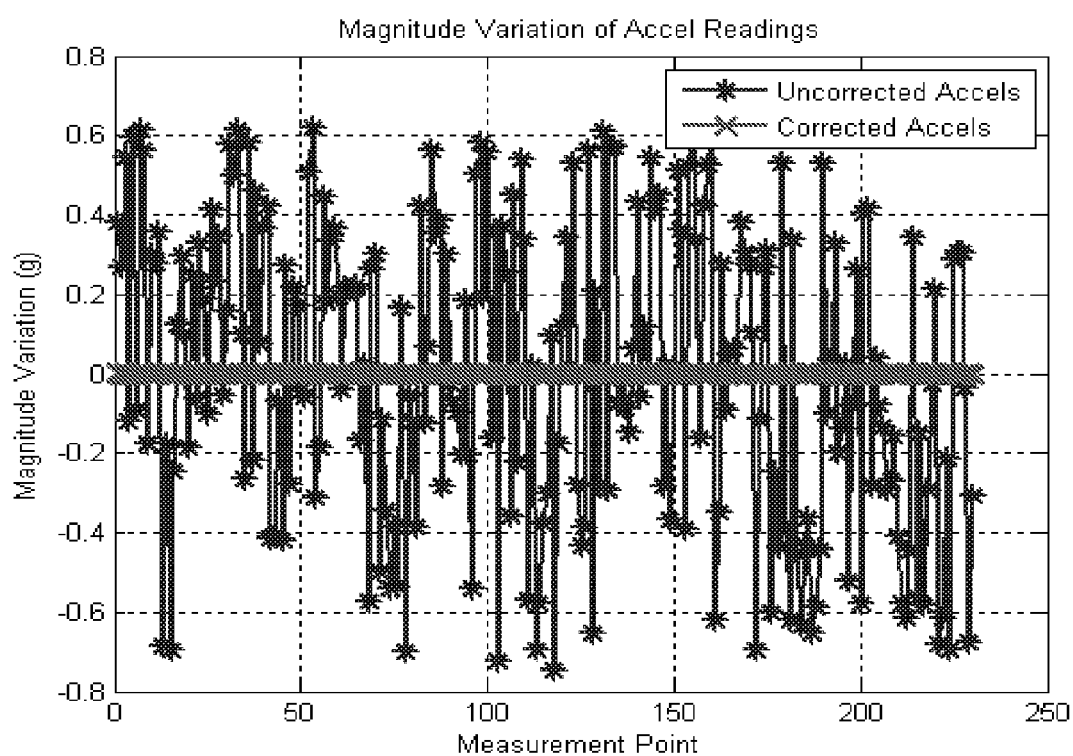

FIG. 2*b* Variation in g reading for all simulation points before and after correction.

Figure 3A:
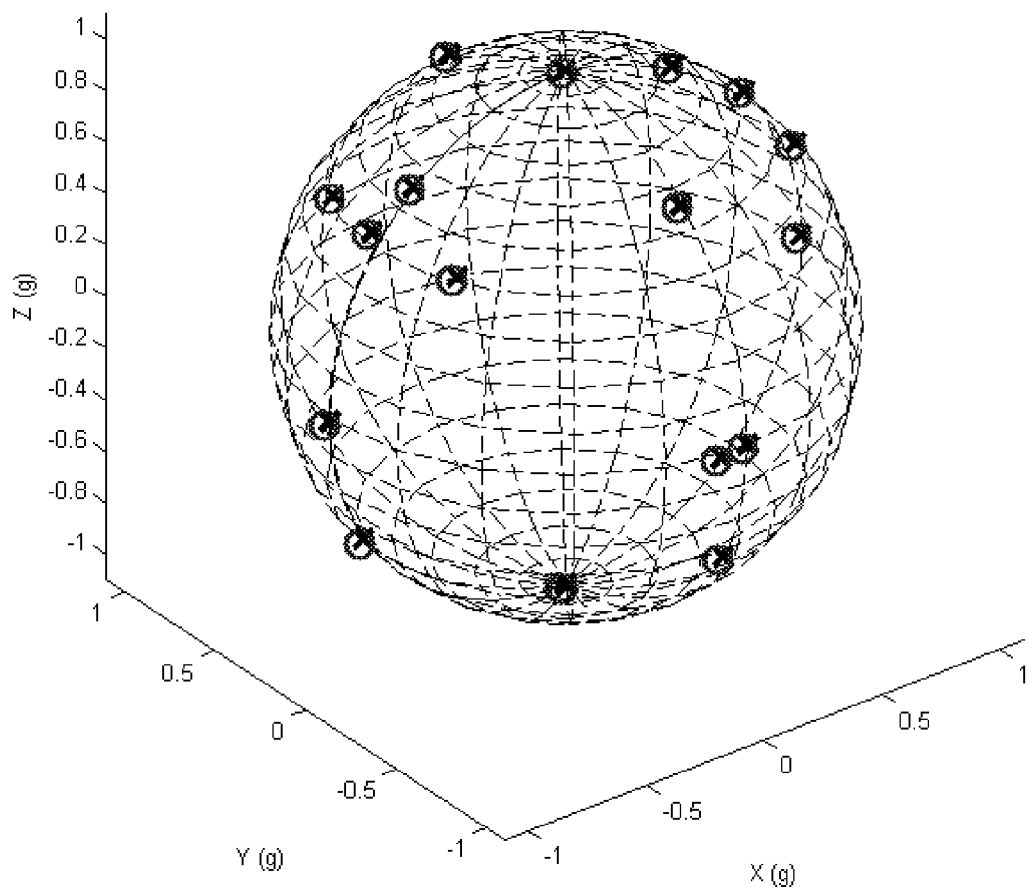

FIG. 3*a* Real measured inclinometer distortion corrections (18 point cal).

Figure 3B:
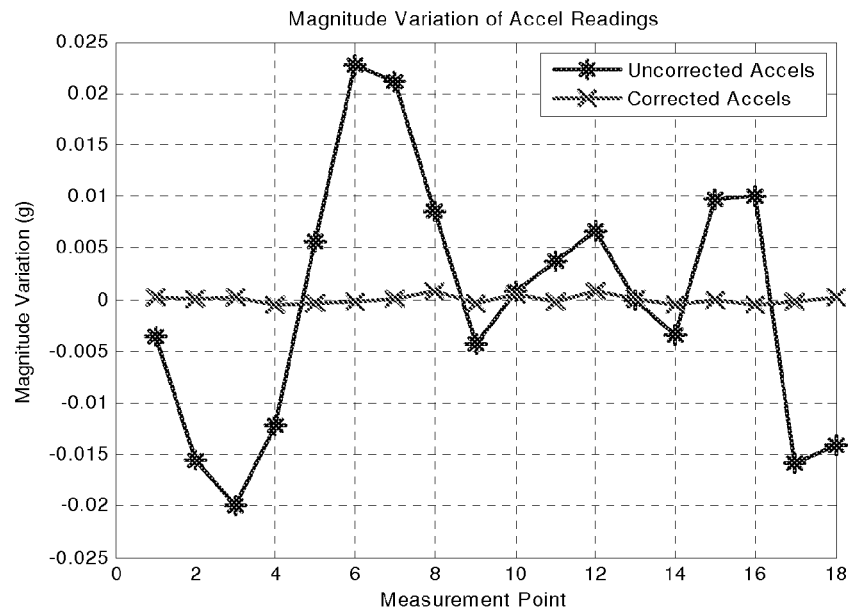

FIG. 3*b* Variation in g reading for all points before and after correction for the 18 point real inclinometer cal.

Figure 4:
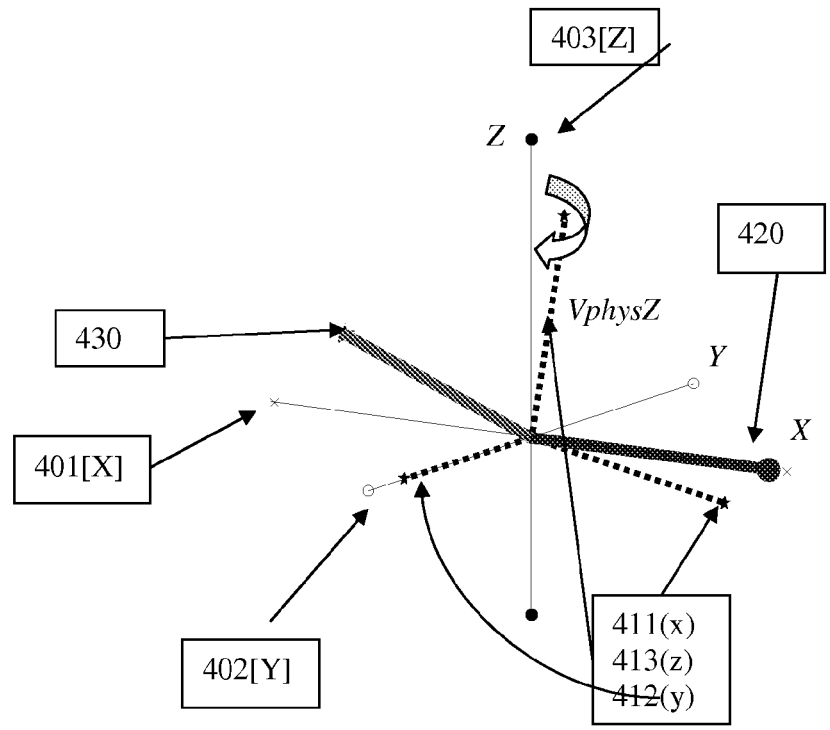

FIG. 4 Reference Alignment Calibration Principle of Operation.

Figure 5:
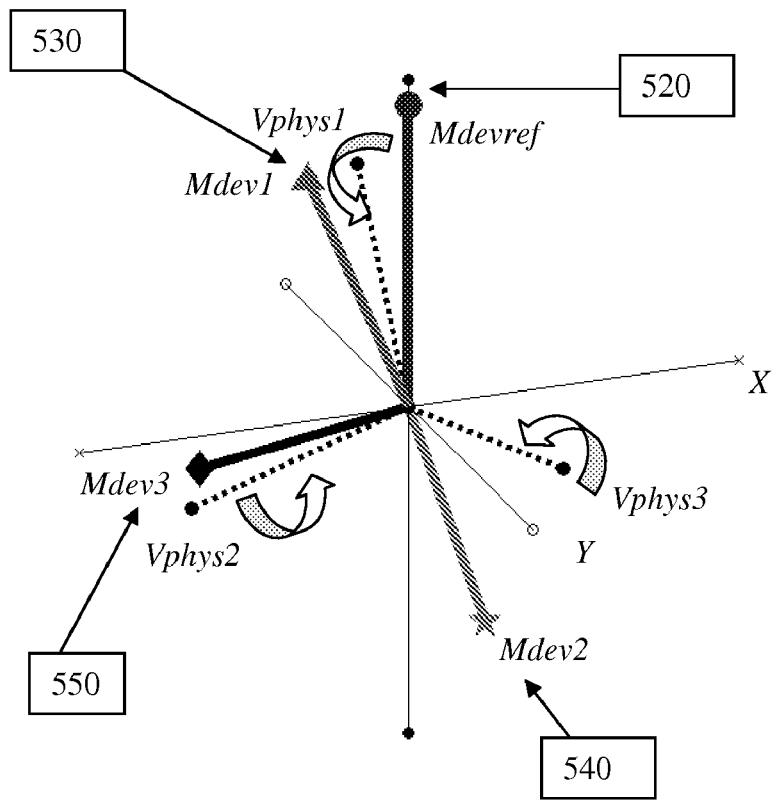

FIG. 5 Reference Alignment Calibration.

Figure 6:
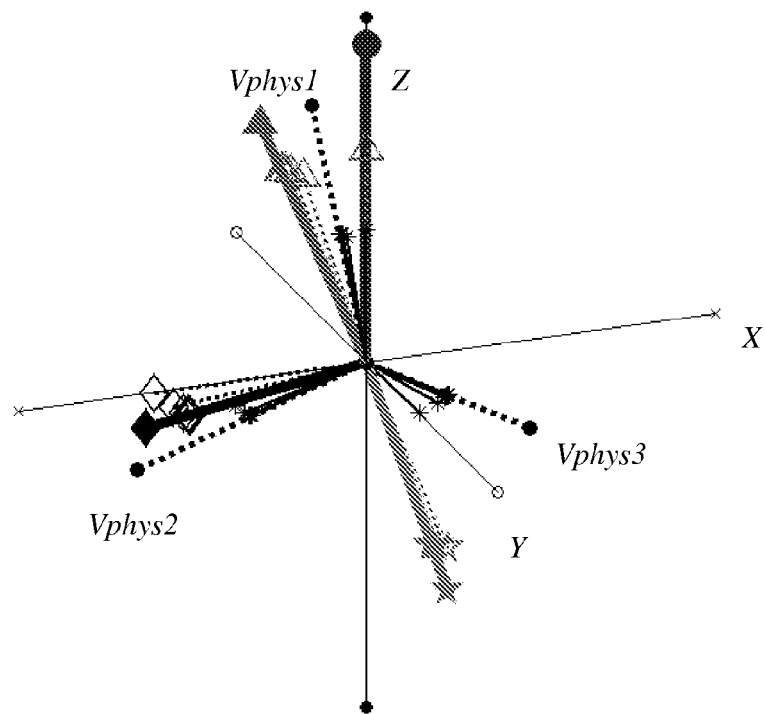

FIG. 6 Reference Alignment Calibration Converges after 14 passes.

Figure 7A:
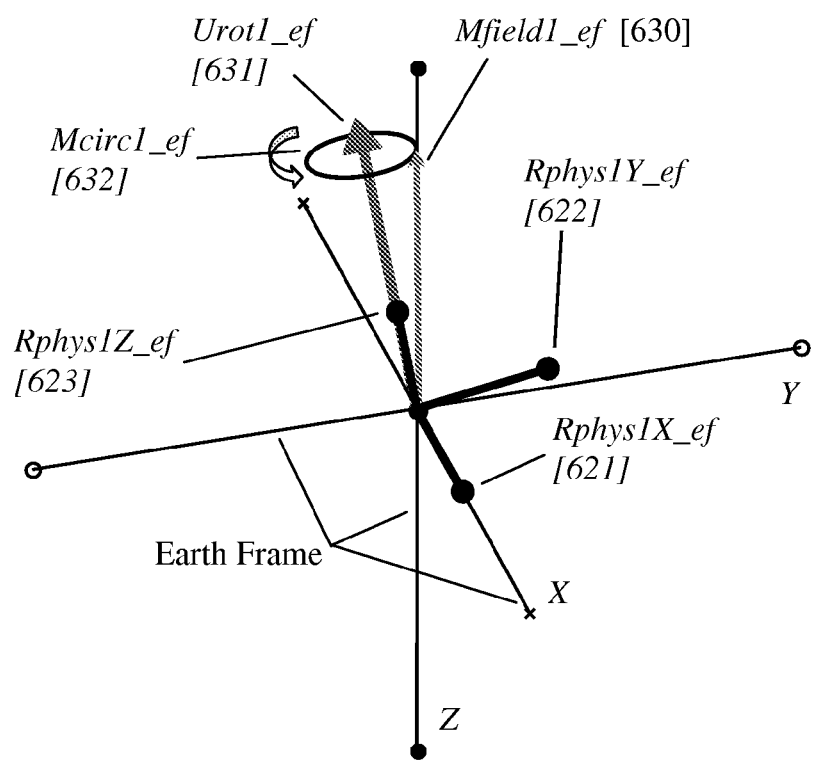

FIGS. 7*a, b, c* Alternative Reference Alignment Calibration.

Figure 8A:
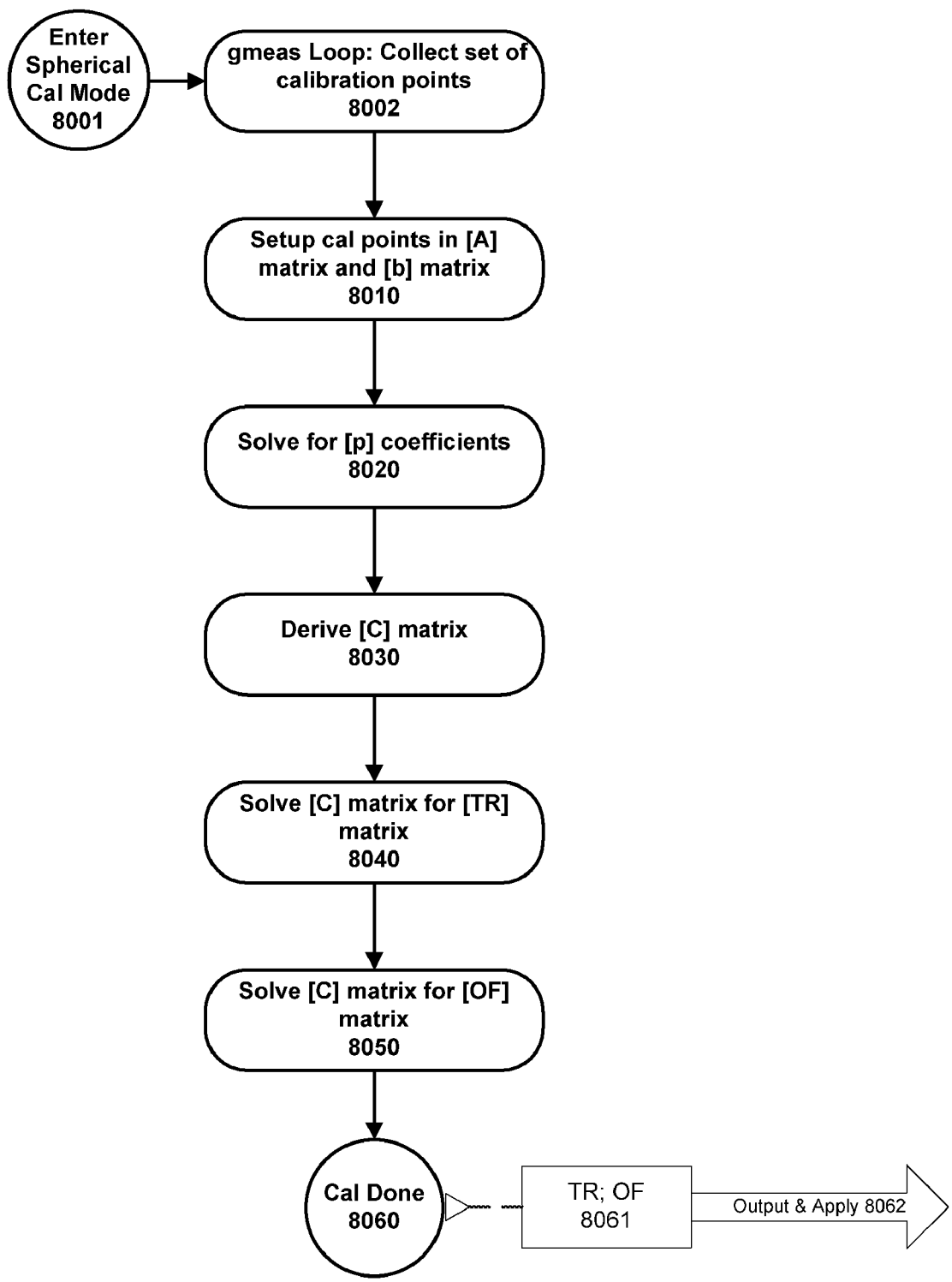
Figure 8B:
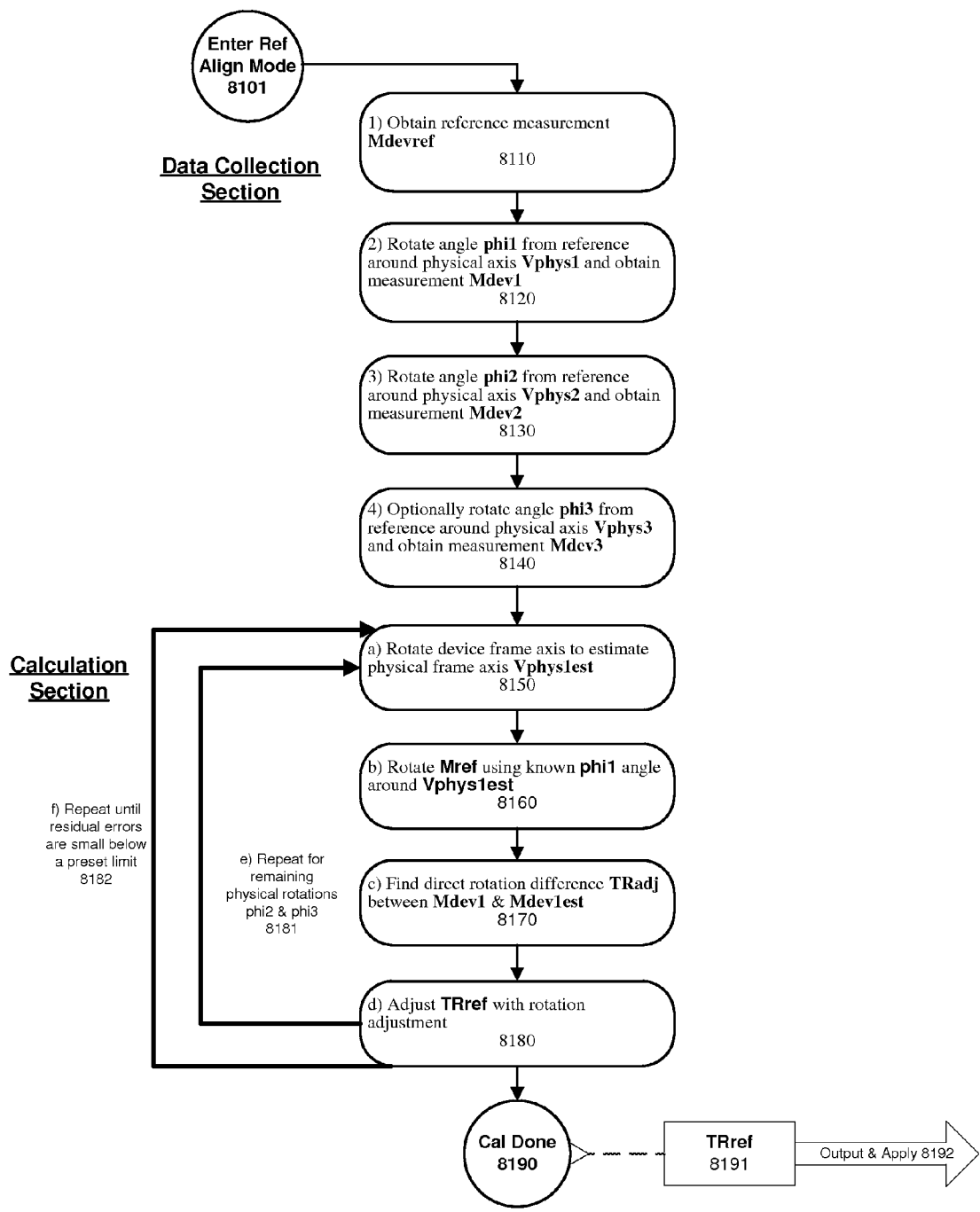

FIG. 8*a* Example Spherical Calibration Data Flow; FIG. 8*b* Example Reference Calibration.

Figure 9:
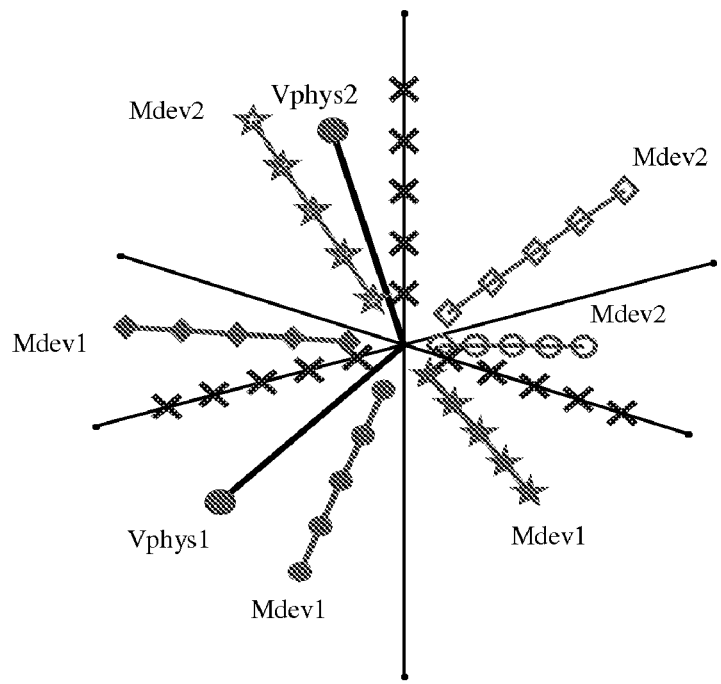

FIG. 9 Factory Alignment Calibration

Figure 10A:
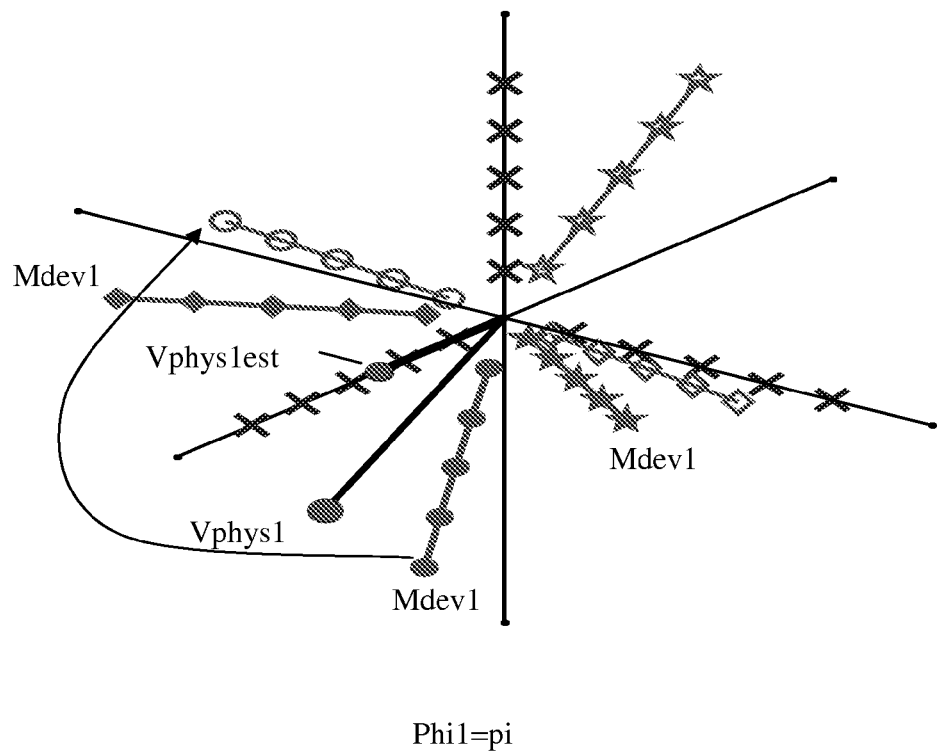

FIG. 10*a* Example Factory Alignment Calibration.

Figure 10B:
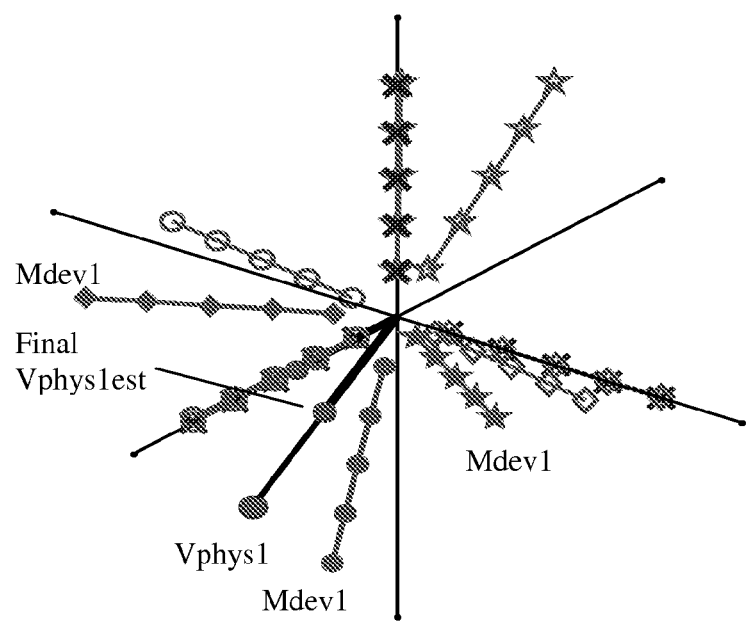

FIG. 10*b* Subsequent & final rotation estimates.

Figure 10C:
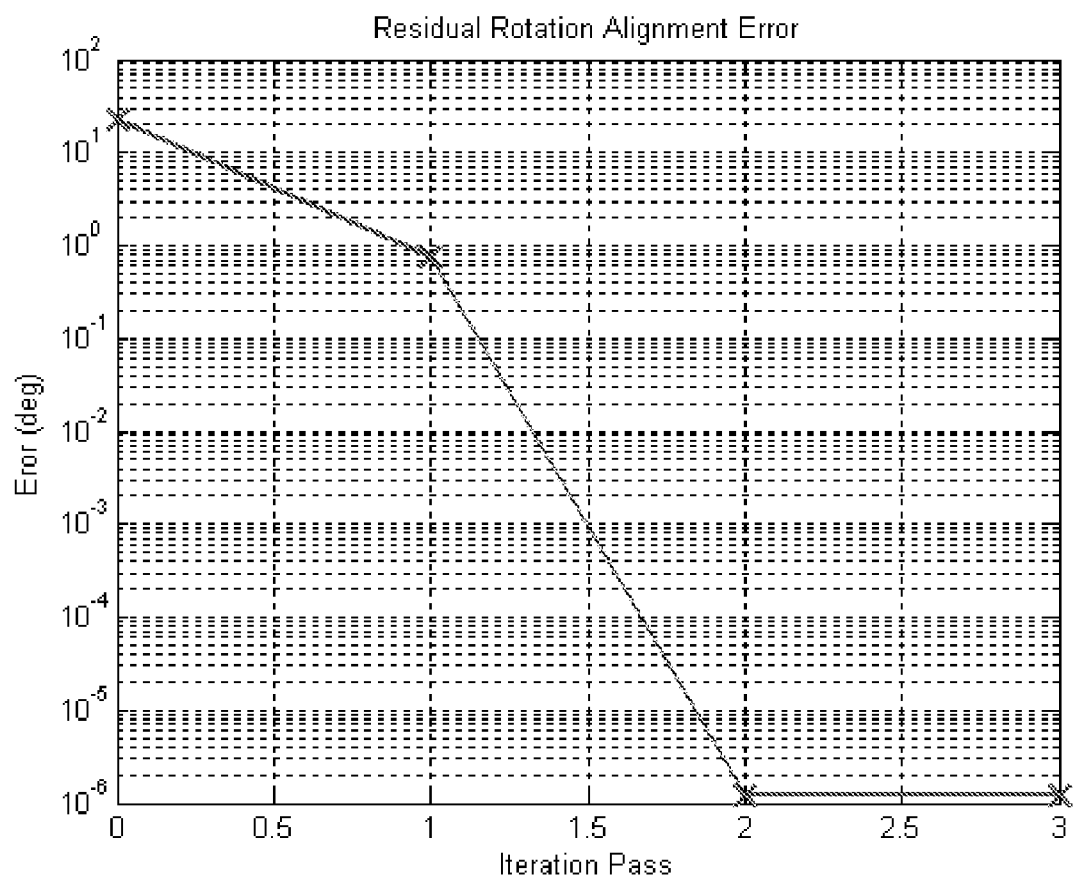

FIG. 10*c* Example Factory Alignment Calibration—rotation error.

SYMBOLS

B earth magnetic field vector

G vector acceleration of gravity, parallel to the down vector in the earth coordinate system, pointed to the center of the earth.

gRAW uncorrected inclinometer measurement.

$\vec{n}$ North direction vector of earth coordinate system, pointed in the direction of the magnetic North Pole in the local horizontal plane.

$\vec{e}$ East direction vector of earth's coordinate system, pointed in an easterly direction in the local horizontal plane.

i Inclination or dip angle p Pitch angle r Roll angle y yaw angle or heading angle X compass orientation of magnetic component in X direction Y compass orientation of magnetic component in Y direction Z compass orientation of magnetic component in Z direction Ra the rotation axis around which the device has rotated gamma, $\gamma$, the angle about Ra which the device has rotated Vphys Physical rotation frame for the Reference Alignment Calibration VphysZ Physical rotation axis for illustrating the operating principle of the Reference Alignment Calibration.

Vphys1 First physical rotation axis for the Reference Alignment Calibration.

Vphys2 Second physical rotation axis for the Reference Alignment Calibration.

Vphys3 Third physical rotation axis for the Reference Alignment Calibration.

phi Known rotation angle around a physical rotation axis.

phi1 Known rotation angle around physical rotation axis Vphys1.

phi2 Known rotation angle around physical rotation axis Vphys2.

phi3 Known rotation angle around physical rotation axis Vphys3.

pi $\pi$ degrees.

Mdevref Device frame measurement of the field in the reference position and/or orientation (before rotation).

Mdev1 Device frame measurement of the field after physical rotation of phi1 around Vphys1.

Mdev2 Device frame measurement of the field after physical rotation of phi2 around Vphys2.

Mdev3 Device frame measurement of the field after physical rotation of phi3 around Vphys3.

TR Transform matrix for correcting an ellipsoid to a sphere.

OF Offset matrix for centering the ellipsoid to x, y, z=0, 0, 0.

TRref Rotational alignment matrix which describes the rotation between the device measurement frame and the physical rotation frame.

Urot1_ef Rotation axis normal to the external reference plane for rotation 1 in earth frame.

Urot2_ef Rotation axis normal to the external reference plane for rotation 2 in earth frame.

Urot1_df Rotation axis normal to the external reference plane for rotation 1 in device frame.

Urot2_df Rotation axis normal to the external reference plane rotation 2 in device frame.

RphysX_df X-axis of physical (apparatus) frame in the device frame. In the device frame RphysX does not change between rotation 1 & rotation 2.

RphysY_df Y-axis of physical (apparatus) frame in the device frame. In the device frame RphysY does not change between rotation 1 & rotation 2.

RphysZ_df Z-axis of physical (apparatus) frame in the device frame. In the device frame RphysZ does not change between rotation 1 & rotation 2.

Rphys1X_ef X-axis physical (apparatus) frame in the earth frame for rotation 1.

Rphys1Y_ef Y-axis physical (apparatus) frame in the earth frame for rotation 1.

Rphys1Z_ef Z-axis physical (apparatus) frame in the earth frame for rotation 1.

Rphys2X_ef X-axis physical (apparatus) frame in the earth frame for rotation 2.

Rphys2Y_ef Y-axis physical (apparatus) frame in the earth frame for rotation 2.

Rphys2Z_ef Z-axis physical (apparatus) frame in the earth frame for rotation 2.

Mcirc1_ef Circle of field measurements for rotation 1 in earth frame.

Mcirc2_ef Circle of field measurements for rotation 2 in earth frame.

Mcirc1_df Circle of field measurements for rotation 1 in device frame.

Mcirc2_df Circle of field measurements for rotation 2 in device frame.

Mfield1_ef Field under measurement in earth frame for rotation 1. Constant in earth frame.

Mfield2_ef Field under measurement in earth frame for rotation 2. Constant in earth frame, equivalent to Mfield1.

Mfield1_df Field under measurement in device frame for rotation 1, at one point in the circle of measurements.

Mfield2_df Field under measurement in device frame for rotation 2, at one point in the circle of measurements.

ThetaX Rotation angle around an axis with known relation to the physical frame for defining the relation between rotation 1 & rotation 2.

DETAILED DESCRIPTION OF THE INVENTION

Spherical Calibration

A Spherical Calibration, in general, can be performed on any directional field sensors for a purpose of removing unwanted offsets, gain, and cross axes errors. The exemplary method shown here is not restricted to a particular type of directional field sensors. Some example applicable directional field sensors include, but are not limited to, magnetic field sensors and inclinometers. For illustration purposes an inclinometer sensor will serve as a vehicle for illustrating the Spherical Calibration method; for purposes of the instant invention a directional field sensor senses at least a two axis vector magnitude of gravity, and/or magnetic and/or inertial field.

Spherical Calibration is performed by acquiring a set of directional field measurements at various and different tilts relative to a constant field of interest. The exact tilt values need not be known, and any distribution of tilts can be used, however better performance is obtained by distributing the sensor x, y, z measurements around a hypothetical sphere; more points improve accuracy. FIG. 8a details an exemplary method for performing a spherical calibration with a sensor comprising at least two axes. The equations discussed herein are for a three axis sensor; however a two axis measurement still achieves an improved calibration, and can be as good or accurate as a three axis sensor when another external input can distinguish the direction on a third axis; for instance when the sensor is an inclinometer then a magnetometer or instructions to the user can help distinguish missing directional information).

For illustration we assume a sensor to be aligned is an inclinometer. In general, under the assumption that an inclinometer sensor output is linear, a set of measured inclinometer readings such as an accelerometer conforms to a quadratic surface, for example, an ellipsoid, with added noise. An ellipsoid may have "stretching" along each axis, representing gain variation, stretching in the cross axis direction, representing orthogonality issues of the sensors, and an offset along each axis. A general ellipsoidal shape is illustrated in FIG. 1.

One goal is to "squish" the ellipsoid shape back to a sphere and center it about a zero point. This can be achieved by finding a transform matrix, TR, and an offset matrix, OF. Given an uncorrected accelerometer measurement gRAW (3×1), we can find a corrected measurement of g with:

$$g = TR \cdot (gRAW - OF) \quad (1).$$

. . . where TR is a 3×3 matrix and OF is a 3×1 matrix.

Given a set of measurements distributed arbitrarily around the ellipsoid, there are a variety of methods for finding TR & OF. One method is to perform a brute force iterative search for the best set of TR & OF to correct the data back to a sphere. There are also a variety of fitting techniques that can be used to fit the shape to a quadratic equation describing the ellipsoidal shape. We use one such fitting technique as an example of how this fitting can be performed.

Starting with an ellipsoidal quadratic equation:

$$ax^2 + bxy + cxz + dy^2 + eyz + fz^2 + gx + hy + iz + k = 0 \quad (2)$$

A set of constant coefficients p=[a b c d e f g h i k] can be determined via least squares fitting of a set of measured points, herein referred to as "calibration points" or inclinometer sensor data. First, rearrange the quadratic for least squares fitting:

$$bxy + cxz + dy^2 + eyz + fz^2 + gx + hy + iz + k = -ax^2 \quad (3)$$

The quadratic can be written in matrix form, setting it up as a set of linear equations with each linear equation in the matrix representing one of the n measurements in the dataset of measured points or calibration points:

$$[A] \cdot [p] = [b] \quad (4)$$

$$\begin{bmatrix} x_1 y_1 & x_1 z_1 & y_1^2 & y_1 z_1 & z_1^2 & x_1 & y_1 & z_1 & 1 \\ x_2 y_2 & x_2 z_2 & y_2^2 & y_2 z_2 & z_2^2 & x_2 & y_2 & z_2 & 1 \\ x_3 y_3 & x_3 z_3 & y_3^2 & y_2 z_3 & z_3^2 & x_3 & y_3 & z_3 & 1 \\ \vdots & \vdots & \vdots & \vdots & \vdots & \vdots & \vdots & \vdots & \vdots \\ x_n y_n & x_n z_n & y_n^2 & y_n z_n & z_n^2 & x_n & y_n & z_n & 1 \end{bmatrix} \cdot \begin{bmatrix} b \\ c \\ d \\ e \\ f \\ g \\ h \\ i \\ k \end{bmatrix} = \begin{bmatrix} -x_1^2 \\ -x_2^2 \\ -x_3^2 \\ \vdots \\ -x_n^2 \end{bmatrix}$$

The fitting matrix table A is setup with 1 row per measurement point. Note that coefficient 'a' has been set equal to 1, since it need not be known to solve for the other coefficients. The number of measurement points is preferably at least nine when all terms are deemed necessary, and recognizing that more data points are better, up to many hundreds; note step 8002 of FIG. 8a.

Now solve for the set of coefficients p that describe the quadratic surface performing a least squares fit on the set of linear equations, step 8020 of FIG. 8a:

$$p = \text{inv}(A^T \cdot A) \cdot A^T \cdot b \quad (5)$$

The set of coefficients p describe a quadratic shape, and thus can be used to determine transform and offset matrices to convert the shape back to a centered sphere from a general ellipsoid, thus resulting in "corrected" inclinometer readings.

Because a set of orientations used for the fit are arbitrarily arranged and there is no reference to compare to, the rotation of the ellipsoid is not determined by this fitting process, and we assume no rotations on the ellipsoid. Consequently a transform matrix (TR) is symmetric, with no rotation component. TR has the form:

$$TR = \begin{bmatrix} tr_{11} & tr_{12} & tr_{13} \\ tr_{12} & tr_{22} & tr_{23} \\ tr_{13} & tr_{23} & tr_{33} \end{bmatrix} \quad (6)$$

A TR matrix determined from the coefficients p may not be scaled accurately for acceleration, however under an assumption that the set of measurements during a calibration were taken under fairly static conditions, then a scaling factor can be applied to TR to force all calibration points to scale to 1.0 g, as true gravity will have negligible variation over the space and time of a calibration.

The offset matrix will have the form:

$$OF = [of_x, of_y, of_z] \quad (7)$$

TR and OF can be used to correct an uncalibrated accelerometer measurement gRAW to the true acceleration g as shown in equation 1.

Determining TR

From the p coefficients we can derive a symmetric matrix C, step 8030 of FIG. 8a:

$$C = \begin{bmatrix} a & b/2 & c/2 \\ b/2 & d & e/2 \\ c/2 & e/2 & f \end{bmatrix}, \text{ where } a = 1 \quad (8)$$

Taking only the square and cross-axes terms of the quadratic we can write the quadratic form:

$$a^T C a = [x \ y \ z] \begin{bmatrix} a & b/2 & c/2 \\ b/2 & d & e/2 \\ c/2 & e/2 & f \end{bmatrix} \begin{bmatrix} x \\ y \\ z \end{bmatrix} = \quad (9)$$

$$ax^2 + bxy + cxz + dy^2 + eyz + fz^2$$

The quadratic form $a^T C a$ is another way to write the original quadratic (not counting offset terms). According to the principle axes theorem, every quadratic form such as this can be diagonalized. If U is an orthogonal matrix then $U^T C U = S$, where S is a diagonal matrix, then substituting $a = U a_2$ transforms $a^T C a$ into $a_2^T S a_2$, which is aligned with the main axes and has no cross-product terms.

The S matrix is a diagonal matrix with eigenvalues along the diagonal describing the stretching and compression along the ellipsoid axes. The U orthogonal matrix contains a set of eigenvectors defining the direction of the ellipsoid axes, thus giving the eigenspace rotation relative to the original main axes.

Therefore based on C we can solve for eigenvectors U and eigenvalues S, which can then be combined into the proper transform matrix form. U and S can be determined in a variety of ways, including Eigen Vector Decomposition and Singular Value Decomposition.

Using SVD:

$$[U, S, V] = \text{svd}(C) \quad (10)$$

And finally we have TR, step 8040 of FIG. 8a:

$$TR = U \sqrt{S} \cdot U^T \quad (11)$$

The offset matrix can be determined by applying the stretching from the symmetric matrix, C, to the offset terms of the quadratic, step 8050 of FIG. 8a:

$$OF = \text{inv}(C) \cdot [g/2, h/2, i/2]^T \quad (12)$$

Simulation

A simulation of the Spherical Calibration algorithm was performed with these known error matrices on a set of noiseless data:

$$TRtru = \begin{bmatrix} 1.1 & 0 & -.2 \\ 0 & 1.0 & 0 \\ -.2 & 0 & .9 \end{bmatrix}, OFtru = [-.2 \ .1 \ .2] \quad (13)$$

The Spherical Calibration algorithm calculation resulted in:

$$TR = \begin{bmatrix} 1.1 & -2.55e-16 & -.2 \\ -2.55e-16 & 1.0 & -1.50e-16 \\ -.2 & -1.50e-16 & .9 \end{bmatrix}, OF = [-.2 \ .1 \ .2] \quad (14)$$

... which matches the true known input distortions to calculation precision.

As shown in equation 1, gRaw can now be corrected to the corrected accelerometer readings g:

$$g = TR \cdot (gRAW - OF) \quad (15)$$

The true undistorted dataset, 210, the distorted, as measured, data set, 220, and the corrected dataset, 230, of the simulation are shown in FIG. 2a. For this simulation 500 data points were used for illustration purposes, but similar results are obtained with as few as 9 points (the minimum number of data points matching the number of independent coefficients). Another indication of how well the algorithm works is to plot the radius variation of all the points before and after correction, as shown in FIG. 2b.

While the full fitting equation, equation (3), has 9 independent coefficients, and therefore requires 9 or more independent data points, it is possible to use fewer coefficients and data points if some simplifying assumptions are made. For instance with many accelerometers the cross axis gain terms (coefficients b, c, e) are either small or unlikely to change significantly, so that dropping the b, c, e terms will not cause appreciable errors, and leave only the 6 offset and gain terms, with only a minimum of 6 data points required.

It is also often the case, as when correcting for accelerometer drift over time, that most of the error will be in the offset terms, and in this case the gain terms can also be ignored, which will result in a minimum of 4 coefficients and 4 data points.

Reference Alignment

A Reference Alignment Calibration employs the concept of an orientation sensing "device frame of reference", defined by the device measurement axes, and a "physical frame of reference", defined by a set of axes representing the frame of reference of the apparatus in which the measurement sensors or devices are housed; in general there will be some amount of misalignment between a device's frame of reference and the casing's, in which it is housed, frame of reference. As an example, a three axis inclinometer is mounted in a housing; manufacturing tolerances cause a rotational misalignment between the inclinometer measurements (device frame) and the housing (physical frame). The goal of the Reference Alignment Calibration is to determine a rotation required to align the device frame with the housing (physical frame).

The reference alignment calibration can be used to align any kind of sensor measurement axes if the sensors are measuring a directional or vector field. Two examples are aligning inclinometer measurement axes to a physical frame using a constant gravitational field as a reference, or, second, aligning magnetometer measurement axes to a physical frame using a constant magnetic field as a reference. For simplicity the following discussion assumes a gravitational field is used to align inclinometer device frame measurement axes to the apparatus physical frame axes. However, this procedure applies equally to any directional field measurement; the reference alignment algorithm is very general and not limited to any particular kind of field measurement, gravitational or otherwise.

Additionally it is noted that any set of additional sensor axes that have a known relation to the device frame being aligned will also be aligned to the physical frame axes by applying the same alignment correction to these additional sensor axes.

A basic principle of a Reference Alignment Calibration is illustrated with a simple example, shown in FIG. 4. A physical reference frame (x, y, z) is misaligned with the device measurement frame (X, Y, Z); the physical frame is rotated 10 degrees, θ, around the y axis from the device frame. Assume a constant acceleration vector is initially aligned with the device x-axis, 420, in FIG. 4. Now when the device is rotated by 180° around the physical frame z axis (VphysZ), the resulting device frame measurement of the vector is now misaligned by 2θ, or 20°, compared to where the measurement would have ended up if the two frames were aligned. A rotation of pi, or π radians (180°), results in double the original misalignment error.

The frame misalignment can be corrected by rotating a sensing device through known angles on two or more axes from an initial reference measurement; a second measurement is taken in the new position and/or orientation; then a rotation matrix is calculated to bring the device reference axes into alignment with the physical reference axes. An alignment calibration performed on any device frame axes will also serve to align rate sensor axes that have a known relation to the device frame axes.

This is illustrated in FIG. 4 wherein a device reference frame is shown as X, Y and Z, 401, 402 and 403, versus a physical reference frame, x, y, z, 411, 412 and 413. In one embodiment of the disclosed invention, as shown in FIG. 4, an orientation sensing device takes measurement 420; then is rotated 180° around physical reference axis z, VphysZ and takes measurement 430. Sufficient information is now available to align the two frames. This specific case only corrects an alignment error in the X-Z plane. In general at least two rotations around different axes Vphys are required to sufficiently define the alignment correction.

Algorithm Implementation

As shown in FIG. 5, an initial reference reading 520 is taken with a device resting in an initial position and/or orientation, Mdevref. Then the device is rotated an angle phi1 around a physical rotation axis Vphys1, where measurement Mdev1 is taken. In this example phi1 is π radians. If the initial g reading was pointed straight along z in the device reference frame, the device frame measurement of g will now have rotated by π around Vphys1.

Similarly, additional known rotations phi can be performed around additional axes. The axes of rotation chosen are preferred to be orthogonal; or chosen such that three orthogonal axes defining a physical reference frame can be determined. A minimum of two rotations with known angles phi from the reference position and/or orientation (around different axes Vphys) are sufficient to define the alignment correction, as together they will each have components along each of the physical axes x, y, z. Once the two axes have been found in the calculation, the third is calculated, being orthogonal to the first two. In the presence of noise and resolution limitations, additional rotations around additional axes provide improved accuracy. The example of FIG. 5 has three rotations in total. As used herein, orthogonality within ±5° of 90° is sufficient for the disclosed algorithm to be practically useful; accuracy will improve with smaller error in orthogonality.

Initially, the angles phi1, phi2, and phi3 are known with respect to a reference measurement position and/or orientation. The device frame measurements of rotated vectors, Mdev1, 530, Mdev2, 540, and Mdev3, 550, are also known. We solve for physical rotation axes Vphys1, Vphys2, and Vphys3, as these define a physical reference frame relative to the device frame. Finally, we calculate a rotational transform matrix to rotate the device measurement frame to match a physical reference frame.

The disclosed method, iteratively, estimates (a) the rotation required to align device axes with physical reference axes; (b) applies the known rotations to the device frame reference measurement; and (c) checks the alignment of the rotated reference with the actual measured device frame measurement; in some embodiments a maximum alignment deviation is compared to the actual deviation. When the physical reference axes are known accurately, or at least within some tolerance, a rotated reference measurement will match the device frame measurement within an acceptable tolerance and the iteration is complete. Optionally, when the reference axes and frame axes measurement are not aligned by greater than some maximum alignment deviation, set by the manufacturer or a user, then the estimated physical reference frame is adjusted and another iteration is performed.

In one embodiment a first estimate for a physical reference axes is to assume they are aligned with a device frame:

$$TRref = \begin{bmatrix} 1 & 0 & 0 \\ 0 & 1 & 0 \\ 0 & 0 & 1 \end{bmatrix} \quad (16)$$

TRref is a rotation matrix to bring a device reference frame into alignment with a physical reference frame, Vphys. Each rotation axis in Vphys is considered separately. A device frame axis is rotated to estimate the physical frame axis:

$$Vphys1est = Vdev1 \cdot TRref \quad (17)$$

In one embodiment an iterative algorithm proceeds in the following steps, shown in FIG. 8b:

Data Collection Section:
1) Obtain reference measurement, Mdevref, [8110].
2) Rotate device angle phi1 from reference around physical axis Vphys1 and obtain measurement Mdev1 [8120].
3) Rotate device angle phi3 from reference around physical axis Vphys2 and obtain measurement Mdev2 [8130].
4) Optionally rotate device angle phi3 from reference around physical axis Vphys3 and obtain measurement Mdev3 [8140].

Calculation Section:
a) Rotate device frame axis to estimate physical frame axis Vphysiest [8150].

$$Vphys1est = Vdev1 \cdot TRref \quad (17)$$

b) Rotate Mref using known phi angle around Vphys1est. In this example phi1=π (180°). [8160]

$$Mdev1est = Rotate(Mdevref, Vphys1est, phi1) \quad (18)$$

c) Find direct rotation difference TRadj between Mdev1 & Mdev1est [8170]:

$$[uVect, uAngle] = DirectRotation(Mdev1est, Mdev1)$$

$$TRadj = RotationMatrix(uVect, uAngle) \quad (19)$$

d) Adjust TRref with rotation adjustment [8180]:

$$TRref = TRref \cdot TRadj \quad (20)$$

e) Perform steps a-d for the remaining measured physical rotations phi2 & phi3, using most recently updated TRref estimate each time [8181].

f) Check residual alignment errors between Mdevest & Mdev. Exit iteration loop when Residual Rotation Errors are acceptable or less than some maximum alignment deviations [8182].

FIG. 6 shows a simulation of the above example converging after 14 iterations. Final Residual Rotation Errors:

Vphys1: Residual Rotation Error: 7.6722e-006 deg
Vphys2: Residual Rotation Error: 3.6655e-005 deg
Vphys3: Residual Rotation Error: 3.5297e-005 deg In some embodiments an algorithm is also configured as a single least squares fit to fit all the rotations simultaneously. This embodiment requires diligence as the rotations are usually different on each of the physical rotation axes. The resulting algorithm may be iterative depending on whether linear approximations are made.

Alternative Reference Alignment Calibrations

Alternative 1

In some embodiments a known angle between rotation axes may not be known; only a known relation between a first circle of measurements and a second circle of measurements is required to be known. For instance, a first circle of measurements can be taken by rotating around an external reference axis, as on a flat surface. As few as three separate measurements may be used to define the circle exactly. Next, the device physical frame is rotated an unknown angle around one of the physical frame axes (physical x-axis for instance). Finally, a new circle of measurements is taken by rotating the tilted system around the original external reference axis. These steps result in two distinct circles of measurements in the device measurement frame as shown in FIGS. 7*a, b, c*.

It is important to clearly distinguish the three important frames of reference involved in the reference alignment calibration.

1) The earth frame is fixed to a local point on the surface of the earth and can be considered constant for this calibration. This frame is indicated by "_ef" in FIG. 7. The rotation axis Urot1_ef=Urot2_ef is fixed in the earth frame.

2) The physical frame, Rphys, is the frame fixed relative to the device frame which has some physical reference or physical indicators to be used for external alignment purposes. Rphys is the "physical frame" of the apparatus itself, which typically houses a device comprising inclinometer or magnetometer sensors.

3) The device frame, also referred to as the device measurement frame, is the frame defined by the sensor measurement axes; the sensor or device axes are fixed relative to the physical frame of the apparatus. The device frame axes may be misaligned relative to the physical frame. A reference alignment calibration finds the rotation matrix which aligns the device (sensor) frame to the physical (apparatus) frame.

A reference alignment calibration can be used to align any kind of sensor measurement axes when the sensors are measuring a directional field. Two examples would be aligning inclinometer measurement axes to a physical frame using a constant gravitational field as a reference, or aligning magnetometer measurement axes to a physical frame using a constant magnetic field as a reference. For simplicity the following discussion assumes a gravitational field is being used to align inclinometer device frame measurement axes to the apparatus physical frame axes. However, this procedure will apply equally to any other directional field measurement, and the reference alignment algorithm is very general and not limited to any particular kind of field measurement, gravitational or otherwise.

Figure 7B:
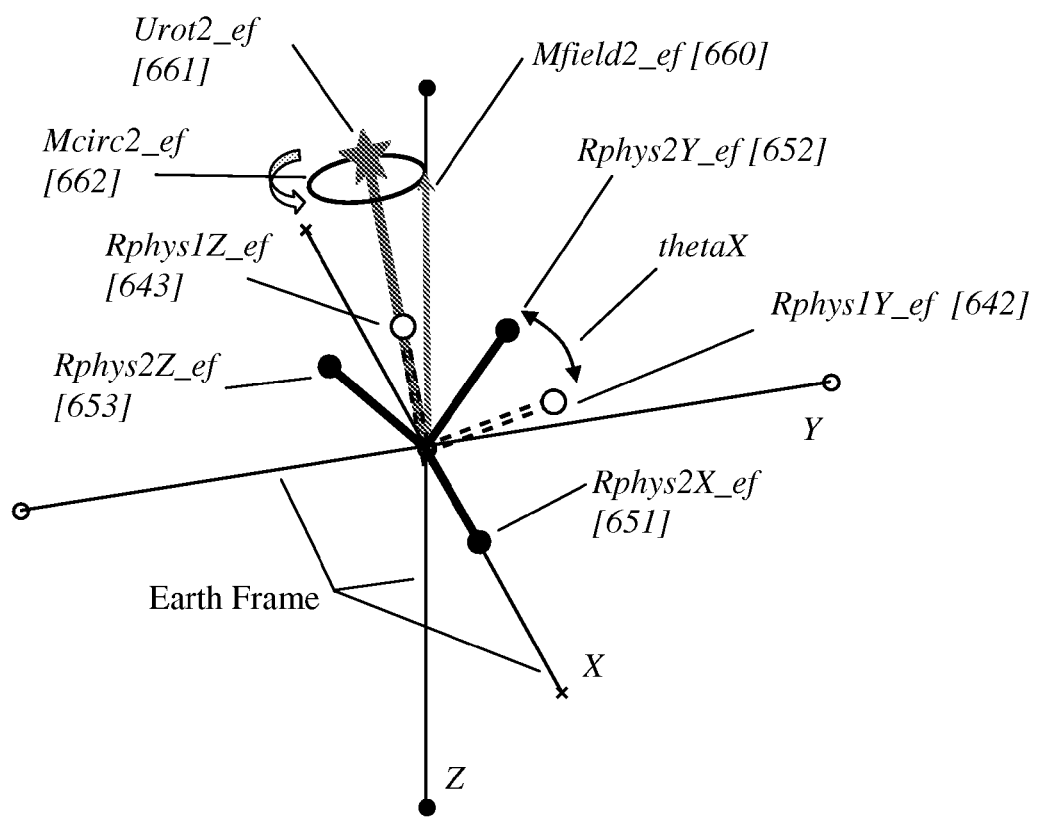

As shown in FIGS. 7*a* and *b*, measurements are taken in two separate circles Mcirc1 [632], and Mcirc2 [662], at two separate tilts as device is rotated around axes Urot1, [631], and Urot2, [661]. FIGS. 7*a* and 7*b* show the resulting measurement circles in the earth frame; FIG. 7*c* shows the circles, 682 and 685, in the device frame. In the earth frame, the gravitational field under measurement, Mfield, is a constant and does not change.

Similarly, the rotational axis Urot is fixed in the earth frame. Thus, comparing FIGS. 7*a* & 7*b*: Mfield1_ef [630]=Mfield2_ef [660], and Urot1_ef [631]=Urot2_ef [661]. However, the physical frame Rphys does change between the two circles in FIGS. 7*a* and 7*b*, so that Rphys1X_ef [621]≠Rphys2X_ef [651]; Rphys1Y_ef [622]≠Rphys2Y_ef [652]; Rphys1Z_ef [623]≠Rphys2Z_ef [653].

In the device frame view, FIG. 7*c*, now the physical frame axes (RphysX_df [671], RphysY_df [672], RphysZ_df [673]) are fixed relative to the device measurement frame axes for the two circles of measurement, whereas the gravitational field has changed between the two circles, and Mfield1_df [680]≠Mfield2_df [683]. Similarly, Urot1_df≠Urot2_df [684]. The physical frame axes Rphys are fixed relative to the device frame, however, they can be misaligned. The goal of the reference alignment cal is to find a rotation that will align the device frame to the physical frame.

Although the example presented here has shown orthogonal axes for all the frames, orthogonal axes are not necessary, but the relative internal relation of the frame axes must be known in order to allow aligning the frames. In this calibration the physical frame is defined by the two circles of measurement, Mcirc1_df and Mcirc2_df, or equivalently by the circle centers Urot1_df and Urot2_df. The relation of Urot1_df & Urot2_df to the physical frame must be known.

For simplification the general assumption applied here is that RphysZ_df is aligned with Urot1_df, and that Urot2_df is rotated around RphysX_df from Urot1_df. The physical frame axes RphysX, RphysY, and RphysZ need not be orthogonal, but they must have a known relation to each other which allows reconstructing a set of orthogonal axes. Whether or not the Rphys frame is orthogonal, Urot2_df will, in this example, lie in the physical frame plane defined by RphysY_df & RphysZ_df (see FIG. 7*c*).

Other relations between Urot1, Urot2, and the physical frame are possible, and can easily be accounted for in the algorithm by properly defining how Urot1 & Urot2 are related in the physical frame.

The set of measurements taken in the device frame will, under the assumption of a constant field, map out two circles. At least three measurements per circle will allow a fitting operation to be performed to fully describe each circle. Each circle is separately fitted in three dimensions, and the resulting circle center points are used to represent two vectors. The first vector, from Mcirc1_df, will be the Urot1_df rotation axis in the device frame; the second vector, from Mcirc2_df, will be the Urot2_df rotation axis in the device frame. By definition of the physical setup in this particular example, Urot1_df is aligned with RphysZ_df. Similarly, Urot2_df will lie in a known physical frame plane since it is rotated around a known axis relative to Urot1_df. In the example here Urot2_df is rotated around the physical x-axis, RphysY_df, which places Urot2_df in the physical frame y-z plane.

With the collected two circles of data there are several methods of aligning the device frame to the physical frame.

The method shown here aligns the center of the first circle, Urot1_df, with the device frame Z-axis, at the same time aligning Urot2_df, which lies in the physical y-z plane, to the device y-z plane.

A Reference Alignment calibration procedure proceeds as follows.

The earth frame rotation axis Urot1_ef=Urot2_ef, is defined as a normal to any flat surface to serve as a reference plane, fixed in earth frame; for instance, a reference plane may be a table top. The physical frame for the device, to which we are trying to align the device frame measurement axes, is in this example defined by a flat surface on the device to serve as a physical plane, and by an axis in the physical frame which has a known relation to the physical frame axes. For our example the physical plane is the physical frame x-y plane (RphysX & RphysY), and the physical frame rotation axis is RphysX.

The field under measurement must be a constant in the earth frame. For purposes of this illustration the field could be a gravitational field, or it could be a magnetic field, and in general the only requirement is that the measurement field is a directional field.

Alignment Measurement Procedure:

(1) With the device physical plane (Rphys1X_ef [621] & Rphys1Y_ef [622]) aligned with the external reference plane, a first series of measurements Mcirc1_ef [632] are taken as the device is rotated on the reference plane around the normal to the reference plane (Urot1_ef [631]=Rphys1Z_ef [623] in FIG. 7a). For the device frame view see FIG. 7c. A minimum of 3 measurements are required to adequately define the circle.

(2) Next, as shown in FIG. 7b, the device physical frame is tilted relative to the external reference plane around the physical frame x axis Rphys2X_ef [651] by any angle thetaX. Typically, the higher the angle up to 90 deg the better the alignment calibration will be.

(3) Now the tilted device is again rotated on the reference plane around the normal to the reference plane (Urot2_ef [661]≠Rphys3_ef2 [653] in FIG. 7b), while a $2^{nd}$ series of measurements Mcirc2_ef [662] are taken. A minimum of 3 measurements are required to adequately define the circle. Note that Urot1_ef=Urot2_ef as seen in the earth frame, but in the device frame Urot2_df is rotated with respect to Urot1_df as shown in FIG. 7c.

Alignment Algorithm

The fitting process to align a device frame axes with the physical axes, in this example, aligns the center of the first circle Urot1_df, which corresponds to the physical frame axis RphysZ_df, with the device frame Z-axis. See FIG. 7c. Because the second circle Mcirc2_df is tilted around physical x-axis RphysX_df, we know that the center of Mcric2_df, Urot2_df, should lie within the physical frame Y-Z plane. The fitting algorithm aligns the center of Mcirc1_df (Urot1_df) to the device frame Z-axis while adjusting alignment so that the center of Mcirc2_df (Urot2_df) aligns within the device frame X-Y plane.

Alignment Algorithm Procedure:

(1) The measured data (in the device measurement frame) Mcirc1_df & Mcirc2_df are fit by standard least squares or another technique to circles in 3D. The centers of these circles, Urot1_df, Urot2_df, can now be determined.

There are various techniques to rotate the device (sensor) measurement frame to the device physical (apparatus) frame. When they are aligned, the Urot1_df vector will align with the device Z-axis, and the Urot2_df vector will lie in the device Y-Z plane. Refer to the device frame view shown in FIG. 7c. We can calculate the rotation either from device frame to physical frame or vice versa.

Three methods of calculating the rotational alignment matrix Tr are shown below.

(2a) Iteratively rotate the vector pair Urot1_df & Urot2_df:
  i) Rotate the vector pair with a direct rotation which aligns Urot1_df to the Z-axis with rotation Tr1.
  ii) Rotate the vector pair around the Z-axis to align Urot2_df to the Y-Z axis with rotation Tr2
  iii) The combined rotations Tr2*Tr1 will result in an overall rotation matrix Tr which performs the alignment in one step.

(2b) Alternative alignment calculation (b).
  i) Find a projection P2 in the plane defined by Urot1_df & Urot2_df such that P2 is 90 deg to Urot1_df.
  ii) Construct a third vector P3 from the cross product of Urot1_df & P2.
  iii) Now perform a least squares rotation fit between the set of vectors [P3, P2, Urot1_df] and the ideal measurement frame axes [1 0 0; 0 1 0; 0 0 1] to find the rotation matrix Tr.

(2c) Alternative alignment calculation (c).
  i) Find a vector Q which is orthogonal to Urot1_df & Urot2_df, for instance by taking the cross product between Urot1_df & Urot2_df.
  ii) Now a rotation fit can be performed to uniquely determine the rotation Tr between the set of vectors Urot1_df & Q and the X-Z device frame axes [1 0 0; 0 0 1].

For (2a), (2b), or (2c) the resulting rotation matrix aligns the device (sensor) frame to the physical (apparatus) frame within the limits of field measurement noise.

Alternative 2

In some embodiments a series of rotations around a series of rotation axes are performed. In this case the angle relationship among the rotation axes is known, rather than a rotation angle phi from a reference reading. Measurements around each rotation axis need not be at known points, only reasonably distributed around an axis. At least two distinct rotation axes are required to fully define the physical reference axes. These two rotation axes define a reference plane, and at least one of the rotation axes must have a known orientation with regard to the physical reference axes.

For instance, a first set of measurements can be taken while rotating around the physical reference z-axis, and a second set of measurements can be taken while rotating around the physical reference y-axis. Then an algorithm similar to the algorithm for the first implementation can be applied to determine the rotation between the device measurement frame and the physical reference frame.

Factory Reference Alignment Calibration

In one embodiment an alignment calibration is performed in the case where each physical alignment orientation for the calibration can have a field sweep applied, as opposed to measuring a single vector for each alignment orientation. This is possible when the fields can be varied for a fixed physical position and/or orientation, as in a factory calibration with custom field generation. A "field generation" or "field sweep" comprises a controlled field or fields with associated sensors for measuring the field(s), which for orientation measurement instrumentation would generally mean the tilt of gravity as measured by an accelerometer or tilt sensor, and a magnetic field direction and magnitude as measured by magnetic sensors. For instance, in the case of a magnetic field calibration this might be in a Helmholtz cage. In the case of accelerometer calibration this might take place in a "tilt robot" which has calibrated tilt points on each axis. The key difference with the single vector application is we now have multiple calibrated field vectors in more than one direction. For a "tilt robot" application it is important to realize that a single physical alignment orientation can have multiple tilt positions during the calibration, but only a single physical alignment position and/or orientation.

Although only a single vector measured at each of two distinct known rotations from reference is the minimum required for an alignment calibration, additional information is useful in several ways. First, it allows for better consideration of residual linearity errors on the field sensors. Second, one or more additional dimensions on each measured dataset allow for an easier and more accurate implementation of a fitting rotation, which results in faster convergence. Each additional axis allows for a more over determined set of data to fit to, improving accuracy. Third, extra information also allows an adjustment to be made for gain & offset as part of the alignment calibration. In other words, a field sweep along a single axis for each physical orientation will be similar to the previous single vector Reference Alignment Calibration implementation, except the axis sweep will now provide gain and offset on that axis. One or more additional sweeps along additional axes will provide gain and offset information on each additional axis. Field sweeps along three known and sufficiently separated axes will fully describe the x, y, z gains, offsets, and cross axis corrections. Additional axes beyond three axes will be useful for reducing errors due to noise or errors associated with any particular axis.

Algorithm Implementation

In some embodiments an initial reference measurement sweep is taken with a device in an initial reference alignment orientation; this is shown as the X's in FIG. 9. The exemplary measurement sweep shown here involves three sweeps along x, y, and z axes; note that a minimum measurement sweep needs to cover some amount of a two dimensional space; for example, at least three points to define a plane.

For rotated device frame measurements Mdev, a device is rotated an angle phi1 around a physical frame axis Vphys1, roughly aligned with the x-axis as shown in FIG. 9; another measurement sweep is obtained in the new orientation, giving the set of solid marker measurements Mdev1, device frame measurements. In this example phi1 is pi, π radians. Similarly, an additional set of device frame measurements can be obtained as in the set of outline marker measurements indicated by Mdev2, which result from a rotation phi2=pi/2 around Vphys2, roughly aligned along the Z-axis.

Initially, the angles phi1 and phi2 are known with respect to the reference measurement position and/or orientation; and the device frame measurements of the rotated vectors, Mdev1,2 are known. One must solve for the physical rotation axes Vphys1,2 as these define the physical reference frame relative to the device frame. Finally, a rotational transform matrix is calculated to rotate the device measurement frame to match the physical reference frame. The calculation of the physical rotation axes Vphys and the rotational transform matrix TRref are shown in equations 21-26.

In some embodiments the disclosed method iterates one or more times for single vector measurements. In one embodiment device frame measurements are rotated back to match a reference alignment, rather than the other way around; in principle either approach works.

This embodiment (a) iteratively estimates a rotation required to align device axes with physical reference axes; (b) applies known rotations to the device frame reference measurement; (c) calculates how closely aligned the reference axes estimate is with the actual reference axes measurement.

A first estimate for the physical axes is to assume they are aligned with the device frame:

$$TRref = \begin{bmatrix} 1 & 0 & 0 \\ 0 & 1 & 0 \\ 0 & 0 & 1 \end{bmatrix} \quad (21)$$

TRref is an estimated rotation matrix between a device frame and a physical reference frame Vphys.

In some embodiments an iterative algorithm works as follows:

(1) Consider each rotation axes in Vphys separately. Rotate device frame axis to estimate physical frame axis:

$$Vphys1est = Vdev1 \cdot TRref \quad (22)$$

(2) Rotate Mdev1 using known phi angle around Vphys1est. In this example phi1=pi.

$$Mref1est = Rotate(Mdev1, Vphys1est, phi1) \quad (23)$$

(3) The datasets Mref & Mref1est are fitted to find a rotation Trot between them. This fit may take the form of a first order fit with offsets and cross terms, and then a rotation matrix, Trot, is extracted:

$$[Trot] = RotationFit(Mref1est, Mref) \quad (24)$$

(4) The Trot matrix in general should not be used directly because the residual rotation error angle may be more or less depending on the size of the known rotation angle phi. For instance, if phi=pi the angle in Trot is approximately twice a required rotation. An angle division results in acceptable convergence is:

$$angDiv = 2 * phi/pi \quad (25)$$

(5) TRadj is a rotation matrix calculated by dividing the direct angle of rotation in Trot by angDiv without altering the rotation axis.

(6) Find new TRref by applying new rotation adjustment TRadj:

$$TRref = TRref \cdot TRadj \quad (26)$$

(7) Perform steps 1-6 for any remaining measured physical rotations, using most recently updated TRref estimate each time. In FIG. 9 example there is one more physical rotation phi2.

(8) Check residual alignment errors between Mrefest & Mref. For instance when the TRadj residual rotation error is small enough for a given application, stop iterating. Exit iteration loop when residual rotation errors are acceptably small, otherwise go back to step 1.

FIG. 10 shows a simulation of the above example converging after 3 iterations. FIG. 10a—left shows the first pass estimate; 10a—right shows subsequent passes converging quickly. FIG. 10b shows the residual alignment errors after each pass:

| | |
|---|---|
| Initial Error: | 22.3 deg |
| First Pass Error: | 0.77 deg |
| Second Pass Error: | 1.2e−6 deg |
| Third Pass Error: | 1.2e−6 deg |

Combining Spherical Calibration with Reference Alignment Calibration

In some embodiments these two calibrations can be combined together into one algorithm, such as a least squares fit, if at least some of the measured points around the ellipsoid for the Spherical Calibration have known reference counterparts. In this case additional rows can be added onto fitting matrix A for defining or matching the rotational alignment between the reference frame and the device frame Combining Tilt Sensor & Magnetometer Sensor Calibration By combining tilt sensor and magnetometer sensor calibration in a module that includes both, for instance a tilt compensated compass, the accuracy of both calibrations can be improved. For instance, a magnetometer calibration may depend on accelerometer accuracy for a horizon reference alignment; any errors in the horizon reference translate directly into heading errors. When both calibrations are combined together, a rotational change recorded by the accelerometer vectors matches the rotational change recorded by the magnetometer vector. This information can be used to improve the reference alignment portion of the calibration.

In some embodiments, when performing both Spherical Calibration and Reference Alignment Calibration, a sequential series of point screenings is taken to eliminate the least reliable data points. Access to both accelerometer and magnetometer sets of data gives more information for reducing the distortion influence of less reliable measurement points.

In some embodiments wherein the accelerometers have high confidence for calibration and alignment—for instance when the accelerometers have already had the spherical and alignment calibrations performed—then the accelerometers can be used as a good horizon reference as part of the magnetometer calibration.

In an embodiment:
1) Acceleration spherical and alignment calibrations are performed on the accelerometers.
2) Magnetometer spherical calibration is performed.
3) Resulting corrected magnetometer readings lie on a centered sphere, but may be rotated from the accelerometer's horizon reference for a variety of reasons. The sphere can be rotated correctly by examining the angles between all the magnetometer-accelerometer pairs (dip angle). When the sphere is rotated correctly then the dip angle between the vectors is constant. This rotation correction is determined by a search to find an optimum rotation. Optionally, a fit is performed to minimize the variation in dip angle.

Other embodiments combine magnetometer and accelerometer calibrations and use magnetometer axes as an alignment reference; then the variation in dip angles is applied to align an accelerometer reference frame to the magnetometer reference frame. Alternatively, a requirement of a constant dip angle serves as an additional constraint on any of the alignment calibration methods discussed previously, when the assumption of a constant magnetic field is made.

A method of fully correcting accelerometer gain, offset, and orthogonality errors, as well as reference alignment rotation errors is disclosed. This method may be performed in the factory or the field, without reference to expensive references.

In one embodiment a method for performing a spherical calibration on acquired inclinometer, also directional field sensor, also vector field, data to correct inclinometer measurement errors arising from cross axis, gain, and offset errors comprises the steps: acquiring inclinometer data in at least two axes comprising at least four different tilt angles; determining a set of coefficients from a best fit calculation; determining a symmetric matrix from the set of coefficients; solving for a transform matrix; solving for an offset matrix; and correcting the acquired inclinometer data with the transform matrix and the offset matrix such that the corrected inclinometer data is within the fit residuals of the true accelerations being measured. In some embodiments at least at least six different tilt angles are required; in some embodiments at least at least nine different tilt angles are required.

Fit residuals are defined as the differences between the measured data points used for calculating the fit and the matching set of points calculated directly from the fit coefficients. The maximum fit residuals are typically set by a manufacturer of an apparatus.

In one embodiment a method to determine misalignment between a device reference frame and a physical reference frame comprises the steps: making a first measurement, Mdevref, with a device in a first physical reference orientation [8110]; rotating the device a first angle, phi1, from the first physical reference orientation around a first physical reference frame axis, Vphys1, [8120];

making a second measurement, Mdev1 [8120]; rotating the device a second angle, phi2, from the first physical reference orientation around second physical reference frame axis Vphys2 [8130]; making a third measurement, Mdev2[8130]; applying an algorithm to estimate the rotation required to align the device frame to the physical reference frame using the known angles phi1, phi2 and the matching physical axes Vphys1, Vphys2[8150-8180]; calculating a residual error [8181]; and determining whether residual error is less than a preset limit [8182]; outputting a rotation matrix, TRref [8192]. In some embodiments additional steps may be added after said making a third measurement, Mdev2[8130]: rotating the device a third angle phi3 from the first physical reference orientation around third physical frame axis Vphys3 [8140 ]; and making a fourth measurement Mdev3[8140] in this fourth physical orientation. In some embodiments additional steps may be added after making a fourth measurement, Mdev3: rotating at least one additional angle phi4 from the first physical reference orientation around at least one additional physical frame axis Vphys4; and making at least one additional measurements Mdev4.

In one embodiment a method to determine misalignment between a device reference frame and a physical reference frame defined by Urot1_df and Urot2_df comprises the steps: a) making at least three first sensor field measurements while rotating the device frame around a first axis Urot1_ef [631], wherein Urot1_ef [631] coincides with a physical reference frame axis Rphys1Z_ef [623]; b) rotating the device frame a first angle thetaX around a second physical frame axis Rphys2X_ef [651]; c) making at least three second sensor field measurements while rotating the device frame around a second axis Urot2_ef [661], wherein Urot2_ef [661] does not coincide with physical reference frame axis Rphys2Z_ef [653]; and d) processing the at least three first and the at least three second measurements to obtain a rotation matrix Tr such that Tr rotates the device reference frame to align with the physical reference frame defined by Urot1_df and Urot2_df such that residual errors between the device reference frame and the physical reference frame after rotation by Tr are below a preset limit. 8. Optionally the method comprises the further steps of: e) processing said at least three first and the at least three second measurements such that vectors Urot1_df and Urot2_df are defined in the device frame; and f) obtaining a rotation matrix Tr such that the device reference frame is aligned with the physical reference frame defined by Urot1_df and Urot2_df such that residual errors between the device frame and the physical frame are below a preset limit; optionally, wherein said at least three first and the at least three second sensor field measurements are at least one of magnetic and one from an inclinometer; optionally, wherein said at least three first and the at least three second sensor field measurements comprises measurements from a magnetometer with at least two sensing axes; optionally, wherein said at least three first and the at least three second sensor field measurements comprise measurements from an inclinometer with at least two sensing axes.

In one embodiment an apparatus for sensing orientation and heading comprises a first sensor comprising at least two sensing axes; a second sensor comprising at least two sensing axes; and an algorithm for performing a spherical calibration on acquired first and second sensor data to correct sensor measurement errors arising from cross axis, gain, and offset errors wherein first and second sensor data is acquired in at least two axes comprising at least four different tilt angles such that an offset matrix and a transform matrix are calculated such that the corrected sensor measurements are within the fit residuals of the true first and second sensor readings being measured; optionally, the first sensor is a magnetometer and the second sensor is an inclinometer; optionally, the first sensor and the second sensor are inclinometers.

In one embodiment an apparatus for sensing orientation and heading comprises a first sensor comprising at least two sensing axes; a second sensor comprising at least two sensing axes; and an algorithm for determining misalignment between a device reference frame and a physical reference frame wherein a series of at least three measurements are made interspersed by at least two rotations about at least two different axes such that a rotation matrix, TRref is calculated with a residual error less than a preset limit; optionally, the first sensor is a magnetometer and the second sensor is an inclinometer; optionally, the first sensor and the second sensor are inclinometers.

The foregoing described embodiments of the invention are provided as illustrations and descriptions. They are not intended to limit the invention to a precise form as described. In particular, it is contemplated that functional implementation of invention described herein may be implemented equivalently in hardware and/or various combinations of hardware and software and/or other available functional components or building blocks. Other variations and embodiments are possible in light of above teachings to one knowledgeable in the art, and it is thus intended that the scope of invention not be limited by this Detailed Description, but rather by Claims following.

We claim:

1. A method for performing a spherical calibration on acquired directional field sensor data to correct directional field sensor measurement errors arising from cross axis gain and offset errors to within a preset limit comprising the steps:
   acquiring directional field sensor data in at least two axes comprising at least four different tilt angles;
   determining a set of coefficients from a best fit calculation;
   determining a symmetric matrix from the set of coefficients;
   solving for a transform matrix;
   solving for an offset matrix; and
   correcting the acquired directional field sensor data with the transform matrix and the offset matrix such that the corrected directional field sensor data is within the preset limit of the true field being measured.

2. A method for performing a spherical calibration as in claim 1 wherein directional field sensor data in at least two axes comprising at least six different tilt angles is acquired.

3. A method for performing a spherical calibration as in claim 1 wherein directional field sensor data in at least two axes comprising at least nine different tilt angles is acquired.

4. A method for performing a spherical calibration as in claim 1 wherein said directional field sensor data is acquired by an inclinometer.

5. A method for performing a spherical calibration as in claim 1 wherein said directional field sensor data is acquired by a magnetometer.

6. A method to determine misalignment between a device reference frame and a physical reference frame comprising the steps:
   making a first measurement, Mdevref, with a device in a first physical reference orientation (8110);
   rotating the device a first angle, phi1, from the first physical reference orientation around a first physical reference frame axis, Vphys1;
   making a second measurement, Mdev1;
   rotating the device a second angle, phi2, from the first physical reference orientation around second physical reference frame axis Vphys2;
   making a third measurement, Mdev2;
   applying an algorithm to estimate the rotation required to align the device frame to the physical reference frame using the known angles phi1, phi2 and the matching physical axes Vphys1, Vphys2; and
   outputting a rotation matrix, TRref.

7. The method of claim 6 comprising, after said applying and before said outputting, the additional steps:
   calculating a residual error;
   determining whether residual error is less than a preset limit.

8. The method of claim 6 comprising the additional steps after said making a third measurement, Mdev2
   rotating the device a third angle phi3 from the first physical reference orientation around third physical frame axis Vphys3; and
   making a fourth measurement Mdev3 in this fourth physical orientation.

9. The method of claim 8 comprising the additional steps after said making a fourth measurement, Mdev3:
   rotating at least one additional angle phi4 from the first physical reference orientation around at least one additional physical frame axis Vphys4; and
   making at least one additional measurements Mdev4.

10. A method to adjust misalignment between a device reference frame and a physical reference frame defined by Urot1_df and Urot2_df to below a preset limit comprising the steps:
    making at least three first sensor field measurements while rotating the device reference frame around a first axis Urot1_ef, wherein Urot1_ef coincides with a physical reference frame axis Rphys1Z_ef;
    rotating the device reference frame a first angle around a second physical reference frame axis Rphys2X_ef;
    making at least three second sensor field measurements while rotating the device reference frame around a second axis Urot2_ef, wherein Urot2_ef does not coincide with physical reference frame axis Rphys2Z_ef; and
    processing the at least three first and the at least three second measurements to obtain a rotation matrix Tr such that Tr rotates the device reference frame to align with the physical reference frame defined by Urot1_df and Urot2_df such that residual errors between the device reference frame and the physical reference frame after rotation by Tr are below a preset limit.

11. The method of claim 10 comprising the further steps of:
    processing said at least three first and the at least three second measurements such that vectors Urot1_df and Urot2_df are defined in the device frame; and obtaining a rotation matrix Tr such that the device reference frame is aligned with the physical reference frame defined by Urot1_df and Urot2_df such that the residual errors between the device frame and the physical frame are below the preset limit.

12. The method of claim 10 wherein said at least three first and said at least three second sensor field measurements comprise at least one of magnetic and one from an inclinometer.

13. The method of claim 10 wherein said at least three first and said at least three second sensor field measurements comprise measurements from a magnetometer with at least two sensing axes.

14. The method of claim 10 wherein said at least three first and said at least three second sensor field measurements comprise measurements from an inclinometer with at least two sensing axes.

15. An apparatus for sensing orientation and heading with residual errors below a preset limit comprising:
  a first sensor comprising at least two sensing axes;
  a second sensor comprising at least two sensing axes; and
  an algorithm for performing a spherical calibration on acquired first and second sensor data to correct sensor measurement errors arising from cross axis, gain, and offset errors wherein first and second sensor data is acquired in at least two axes comprising at least four different tilt angles such that an offset matrix and a transform matrix is calculated such that the residual errors of the corrected sensor measurements are below the preset limits of the true first and second sensor readings being measured.

16. The apparatus of claim 15 wherein said first sensor is a magnetometer and said second sensor is an inclinometer.

17. The apparatus of claim 15 wherein said first sensor is a rate sensor.

18. The apparatus of claim 15 wherein the first sensor and the second sensor are inclinometers.

19. An apparatus for sensing orientation and heading comprising:
  a first sensor comprising at least two sensing axes;
  a second sensor comprising at least two sensing axes; and
  an algorithm for determining misalignment between a device reference frame and a physical reference frame wherein a series of at least three measurements by both the first and second sensors are made interspersed by at least two rotations about at least two different axes of each first and second sensors such that wherein a rotation matrix, TRref is calculated.

20. The apparatus of claim 19 wherein said first sensor is a magnetometer and said second sensor is an inclinometer.

21. The apparatus of claim 19 wherein said first sensor and said second sensor are inclinometers.

22. The apparatus of claim 19 wherein at least one of said first sensor and said second sensor are a rate sensor.

* * * * *